(12) United States Patent
Resare et al.

(10) Patent No.: US 8,915,275 B2
(45) Date of Patent: *Dec. 23, 2014

(54) APPARATUS AND SYSTEM FOR INTEGRATION OF A CENTRAL TIRE INFLATION VALVE INTO A WHEEL

(75) Inventors: Lars Johan Resare, Trenton, NJ (US); Olivier Marsaly, L'Isle Adam (FR); Larry K. Rogers, Bordertown, NJ (US); Pascal Serdarian, Princeton Jct, NJ (US)

(73) Assignee: Hutchinson S.A., Paris (FR)

( * ) Notice: Subject to any disclaimer, the term of this patent is extended or adjusted under 35 U.S.C. 154(b) by 294 days.

This patent is subject to a terminal disclaimer.

(21) Appl. No.: 13/220,065

(22) Filed: Aug. 29, 2011

(65) Prior Publication Data
US 2012/0067483 A1 Mar. 22, 2012

Related U.S. Application Data

(63) Continuation of application No. 11/709,533, filed on Feb. 22, 2007, now Pat. No. 8,006,731.

(60) Provisional application No. 60/877,031, filed on Dec. 22, 2006.

(51) Int. Cl.
*B60C 29/02* (2006.01)
*B60C 23/00* (2006.01)
*F16K 15/14* (2006.01)
*F16K 17/04* (2006.01)

(52) U.S. Cl.
CPC ............ *B60C 23/003* (2013.01); *F16K 15/144* (2013.01); *F16K 17/0453* (2013.01)
USPC .......................................... 152/416; 152/415

(58) Field of Classification Search
USPC .................................................. 152/415–419
See application file for complete search history.

(56) References Cited

U.S. PATENT DOCUMENTS

| | | |
|---|---|---|
| 2,452,527 A | 10/1948 | Hurst |
| 2,543,156 A | 2/1951 | Francisco |
| 2,577,458 A | 12/1951 | Gaiptman |
| 2,871,905 A | 2/1959 | Stanton |
| 3,362,452 A | 1/1968 | Harnish |
| 4,693,696 A | 9/1987 | Buck |
| 4,705,090 A | 11/1987 | Bartos |
| 4,765,385 A | 8/1988 | McGeachy |
| 4,922,946 A | 5/1990 | Boulicault |
| 4,932,451 A | 6/1990 | Williams et al. |
| 4,938,272 A | 7/1990 | Sandy et al. |
| 4,997,235 A | 3/1991 | Braungart |
| 5,094,263 A | 3/1992 | Hurrell et al. |

(Continued)

FOREIGN PATENT DOCUMENTS

| | | |
|---|---|---|
| DE | 3607369 | 9/1987 |
| EP | 1262340 | 12/2002 |

*Primary Examiner* — Jason Bellinger
(74) *Attorney, Agent, or Firm* — Reed Smith LLP

(57) ABSTRACT

This is an apparatus and system for integration of Central Tire Inflation (CTI) valve functionality directly into a wheel. The CTI valve may be attached to the wheel or integrated into the wheel. In addition, the CTI valve may have a valve body or the valve components can be installed directly into the wheel. An air passageway between the vehicle air source and the CTI valve and/or an air passageway from the CTI valve to the tire cavity can also be employed.

29 Claims, 16 Drawing Sheets

(56) References Cited

U.S. PATENT DOCUMENTS

| | | |
|---|---|---|
| 5,221,381 A | 6/1993 | Hurrell |
| 5,293,919 A | 3/1994 | Olney et al. |
| 5,355,924 A | 10/1994 | Olney |
| 5,975,174 A | 11/1999 | Loewe |
| 6,474,383 B1 | 11/2002 | Howald et al. |
| 7,367,371 B2 | 5/2008 | Meydieu et al. |
| 7,686,051 B2 | 3/2010 | Medley et al. |
| 8,006,731 B2 * | 8/2011 | Resare et al. ............... 152/416 |
| 2005/0205182 A1 | 9/2005 | Maquaire et al. |
| 2007/0187015 A1 | 8/2007 | Alff |
| 2010/0038004 A1 | 2/2010 | Saadat |
| 2010/0147387 A1 | 6/2010 | Medley et al. |
| 2010/0207445 A1 | 8/2010 | Medley et al. |

* cited by examiner

APPARATUS AND SYSTEM FOR INTEGRATION OF A CENTRAL TIRE INFLATION VALVE INTO A WHEEL

CROSS-REFERENCE TO RELATED APPLICATIONS

This application is a continuation of, and claims the benefit under 35 U.S.C. §120 of the earlier filing date of, copending U.S. patent application Ser. No. 11/709,533, filed on Feb. 22, 2007, now U.S. Pat. No. 8,006,731, which claims the benefit under 35 U.S.C. §119(e) of the earlier filing date of U.S. Provisional Patent Application No. 60/877,031 filed on Dec. 22, 2006.

BACKGROUND

This invention pertains to the integration of Central Tire Inflation (CTI) valve functionality into a wheel. More particularly, it describes means for attachment of the CTI valve to the wheel, cavities in the wheel to accommodate CTI valves, and placing the internal components of a CTI valve directly into a wheel.

There are a number CTI valves already on the market. One example is provided in FIG. 1, which shows a section of a one-piece wheel assembly 1 with a hose fitting 2 mounted to the vehicle hub (not shown). The one-piece wheel assembly 1 consists of a wheel 3 with tire 4. Parts of wheel 3 include rim portion 5, disc portion 6, drop center area 7, airway 8, and hub bore area 9. Fitting 2 connects to an external conduit (air hose 10); the air hose 10 connects to the wheel 3 via another fitting 11. The tire 4 and rim 5 form a tire air chamber 12 that contains a pressured fluid (usually air).

Another example is provided by FIG. 2, which shows a section of a two-piece wheel assembly 13 configured for an externally mounted CTI valve 14 and a quick release valve 15 mounted on the two-piece wheel 16. The two-piece wheel assembly 13 consists of a two-piece wheel 16 with tire 4. Parts of wheel 16 include rim portion 5, disc portion 6, rim flat area 17, and hub bore area 9. The tire 4 and rim 5 form a tire air chamber 12 that contain a pressured fluid (usually air). Two-piece wheels 16 are usually used when a bead lock 18 or run flat device (not shown) are utilized in the two-piece wheel assembly 13. Two-piece wheels 16 consist of two major parts, the inner rim half 19 and outer rim half 20. The two rim halves 19 and 20 are sealed with an o-ring 21 to prevent air from escaping out of tire air chamber 12. Bolts 22 and nuts 23 hold the two rim halves 19 and 20 together.

FIG. 3 shows a section of another two-piece wheel assembly 24 configured for a partially integrated CTI valve 25 attached to the wheel. The configuration shown is the same as in FIG. 2, except the CTI valve 25 uses an airway 26 from the hub (not shown) to the CTI valve 25 and an airway 27 from the CTI valve 25 to the tire cavity 12. These internal passageways 26 and 27 are more fully described and discussed in U.S. Pat. No. 6,474,383 and European Patent EP 1 262 340 A2.

Thus, as the foregoing makes clear, current technology may employ any one of several configurations. First, a fitting 2 mounted on the vehicle hub (not shown) can bring air through a hose 10 to a fitting on the wheel 11. The tire cavity 12 can be inflated or deflated from a control system in the vehicle. (See, e.g. FIG. 1). Second, a fitting 28 on the vehicle hub (not shown) can bring air through a CTI hose 29 to a CTI valve 14 mounted on the wheel 16. Another air hose 30 channels air from the CTI valve 14 to the quick release valve 15. Another hose 31 brings air from the quick release valve to a sealed fitting 32 on the wheel 16. The tire cavity 12 can be inflated or deflated from a control system in the vehicle. (See, e.g., FIG. 2). Third, a CTI valve 25 can be mounted on the wheel itself. A passageway in the wheel 26 brings air from a port on the vehicle hub (not shown) to the CTI valve 25. A second passageway in the wheel 27 brings air from the CTI valve 25 to the tire cavity 12. The tire cavity 12 can be inflated or deflated from a control system in the vehicle. These internal passageways 26 and 27 are patented under U.S. Pat. No. 6,474,383 and European Patent EP 1 262 340 A2. (See, e.g., FIG. 3).

However, all of the aforesaid methods and apparatus have disadvantages. Rocks, curbs, or brush can damage external mounted valve configurations with hoses during vehicle operations. Externally mounted CTI valves with hoses and fittings typically contain a high number of components. Externally mounted CTI valves with hoses and fittings are complex and difficult to assemble. Further, the higher number of components result in an increased number of leakage points. Fittings can be stripped out during assembly. The higher number of components also result in increased time required to assemble and disassemble. The externally mounted CTI valve is subject to harsh external environments including water, mud, temperature extremes, and impact damage. The externally mounted CTI valve and hoses result in excessive weight, resulting in wheel imbalance and increased weight. The higher number of components result in excessive cost. Externally mounted CTI valves are very "bulky" and take up a lot of space on the wheel face. Some CTI valves require heavy covers for protection. (See, e.g., CTI protection cover 33 in FIG. 4). Finally, externally mounted CTI valves are highly visible and are more susceptible to damage from hostile fire (on military wheels) or sabotage by cutting external tubing.

SUMMARY

Thus, as previously noted, the purpose of this invention is to avoid the disadvantages of prior art by integrating Central Tire Inflation (CTI) valve functionality directly into a wheel. In our invention, the CTI valve may be attached to the wheel or integrated into the wheel. In addition, the CTI valve may have a valve body or the valve components can be installed directly into the wheel. An air passageway between the vehicle air source and the CTI valve and also an air passageway from the CTI valve to the tire cavity may or may not be employed.

When the CTI valve is partially or totally embedded into the wheel, the following novel features and advantages are created. First, integrated CTI valves are well protected and less susceptible to environmental fluctuations including but not limited to temperature, humidity, harsh chemicals, theft and impact loads. Second, CTI valves partially or completely embedded in the wheel are easier to assemble and remove. Third, the CTI valve can be located closer to the wheel hub to reduce centrifugal forces and reduce wheel imbalance. Fourth, CTI valves partially or completely embedded in the wheel reduce wheel imbalance because the weight of the CTI valve is compensated by the weight taken out from the cavity in the wheel. Fifth, CTI valves partially or completely embedded in the wheel result in fewer components required, also reducing cost. Sixth, CTI valves partially or completely embedded in the wheel result in a better attachment to the wheel without excessive components or hardware. Seventh, CTI valves partially or completely embedded in the wheel results in less weight, especially when part of the wheel material is removed in order to attach the valve or create an air passageway to the valve. Eighth, CTI valves partially or completely embedded in the wheel are less likely to leak air. Ninth, CTI valves partially or completely embedded in the wheel can be smaller due to the fact that there is no need for a valve housing.

DESCRIPTION

A basic overview of the construction of our invention, including the changes, additions, and improvements we have made over prior methods and apparatus are best understood by review of FIGS. 5 through 10.

Figure 1:
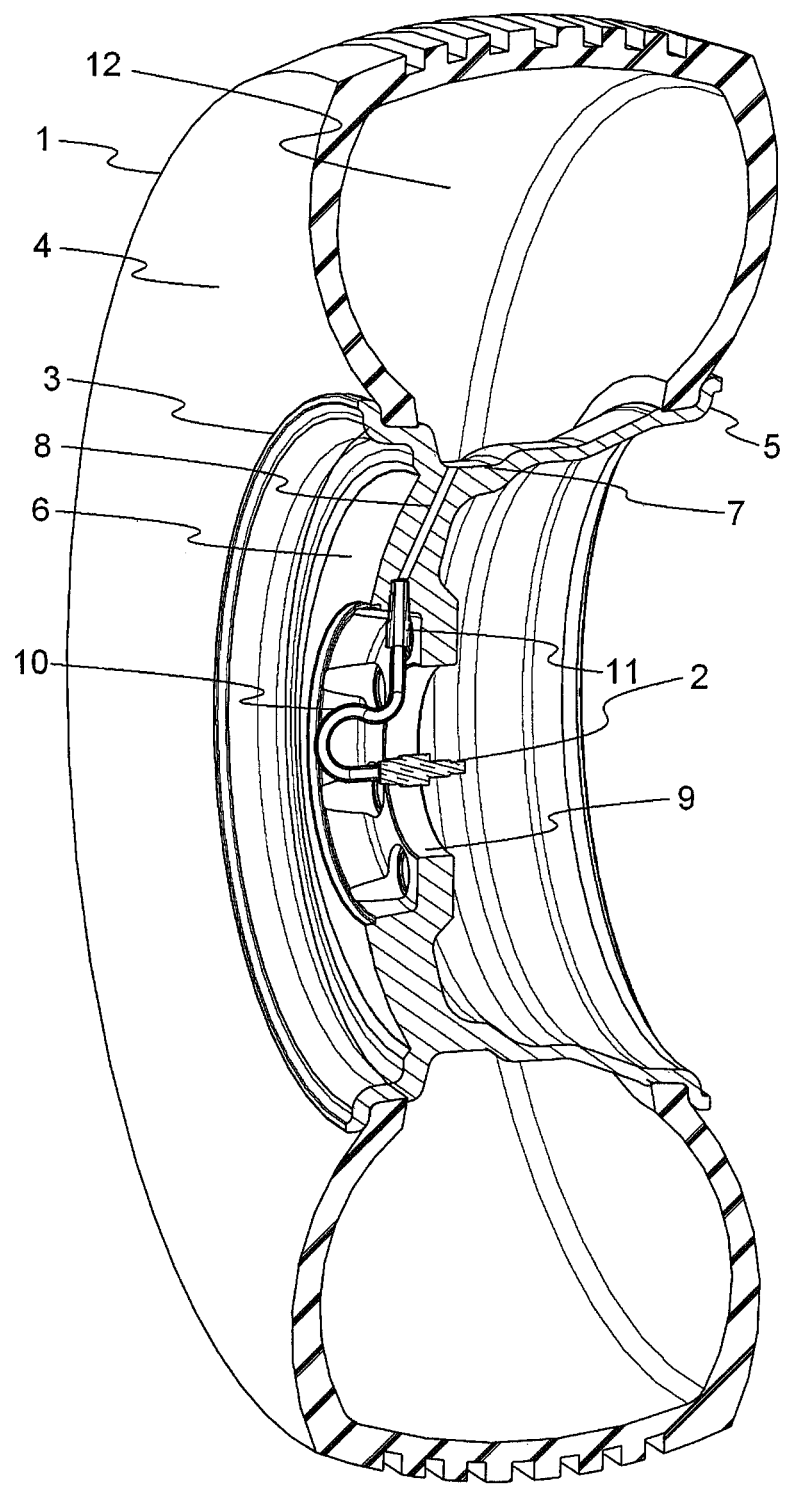
FIG. 1 provides a perspective partial cross-sectional view of a prior art one-piece wheel assembly with CTI valve mounted to vehicle hub.
Figure 2:
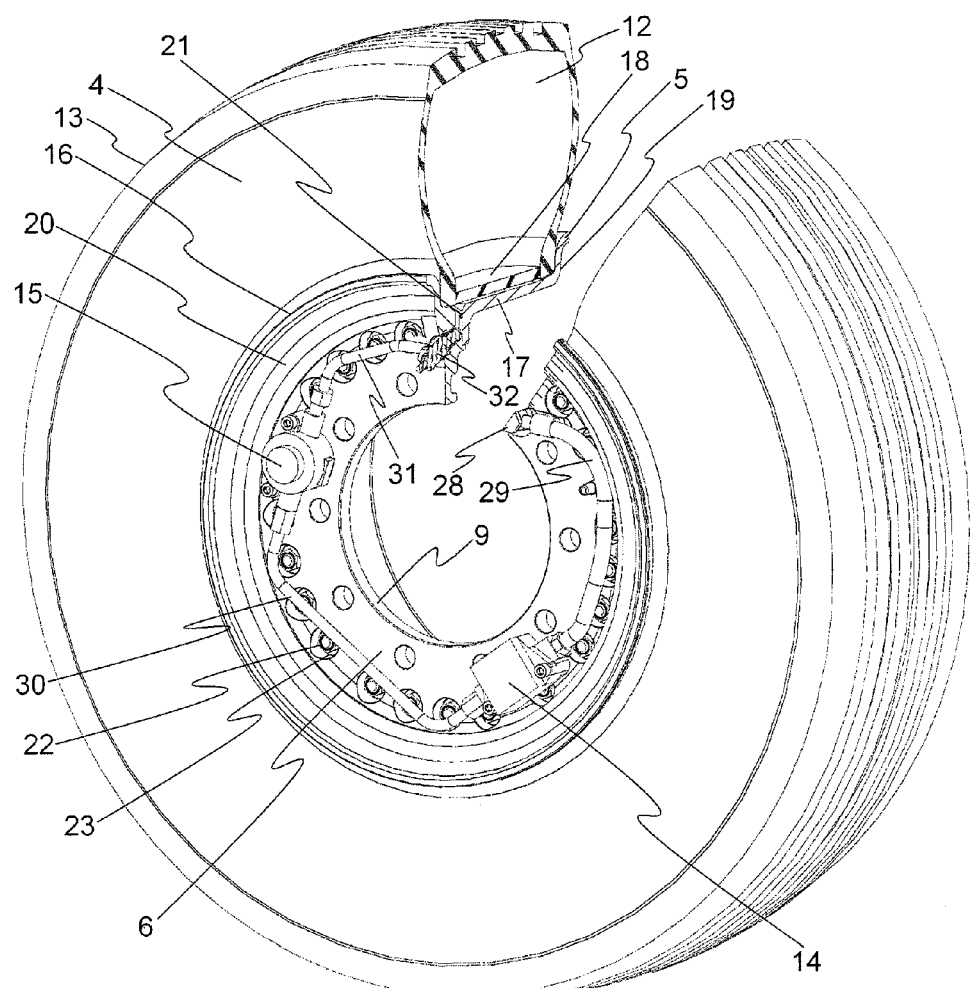
FIG. 2 provides a perspective partial cross-sectional view of a prior art two-piece wheel assembly with externally mounted CTI valve and quick release valve.
Figure 3:
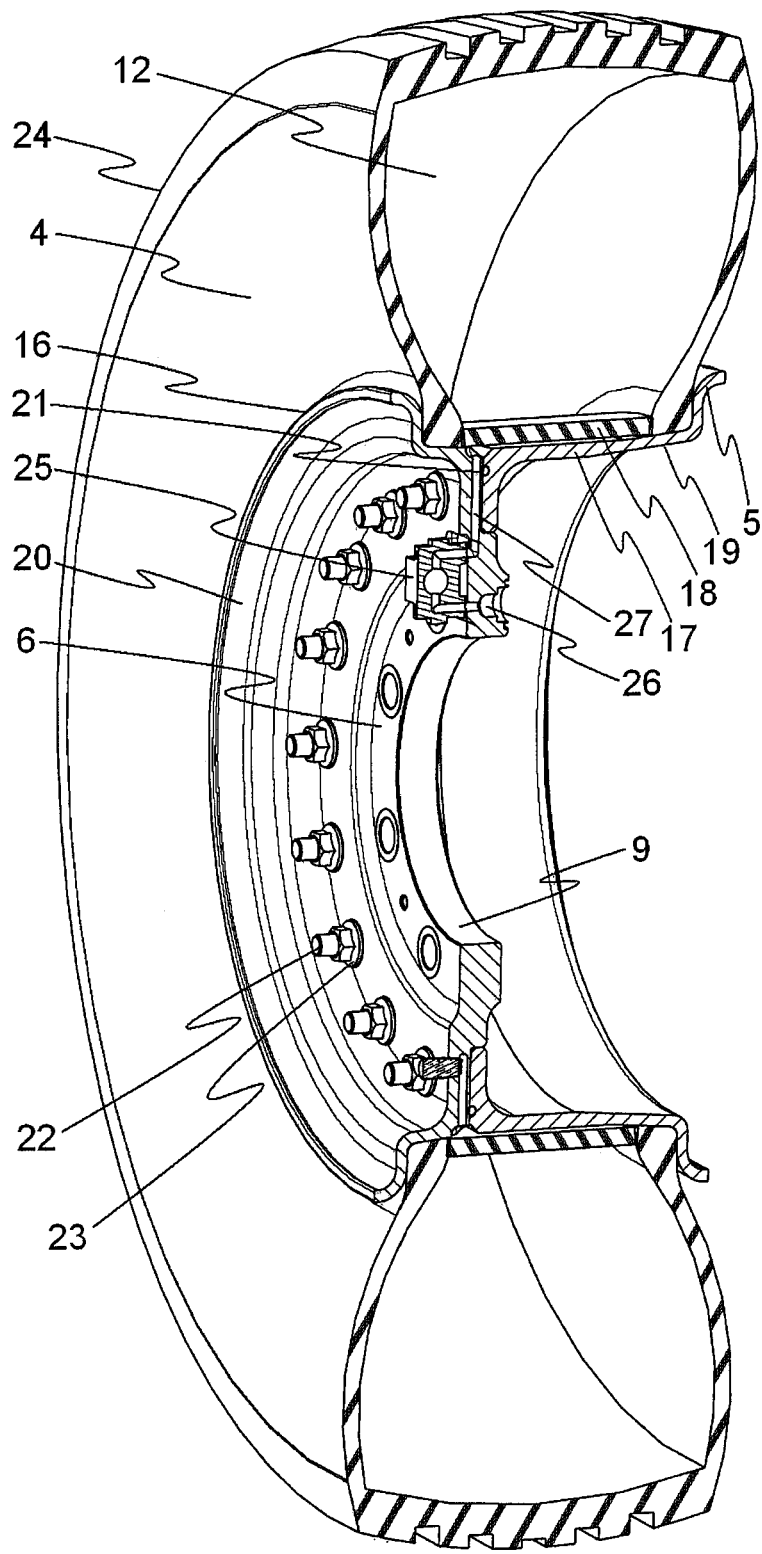
FIG. 3 provides a perspective partial cross-sectional view of a prior art two-piece wheel assembly with a partially integrated CTI valve attached to the wheel.
Figure 4:
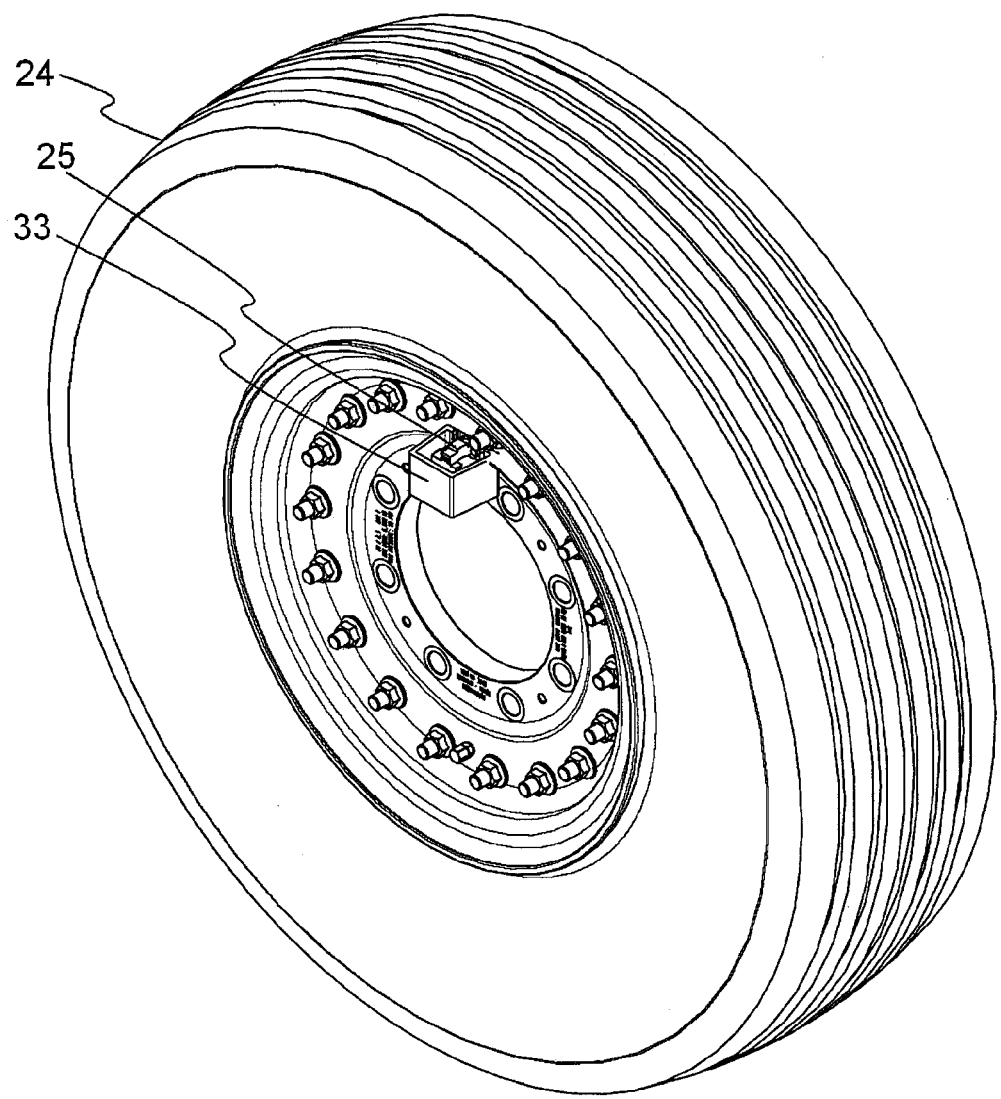
FIG. 4 provides a perspective view of a prior art CTI valve cover mounted on a wheel.
Figure 5:
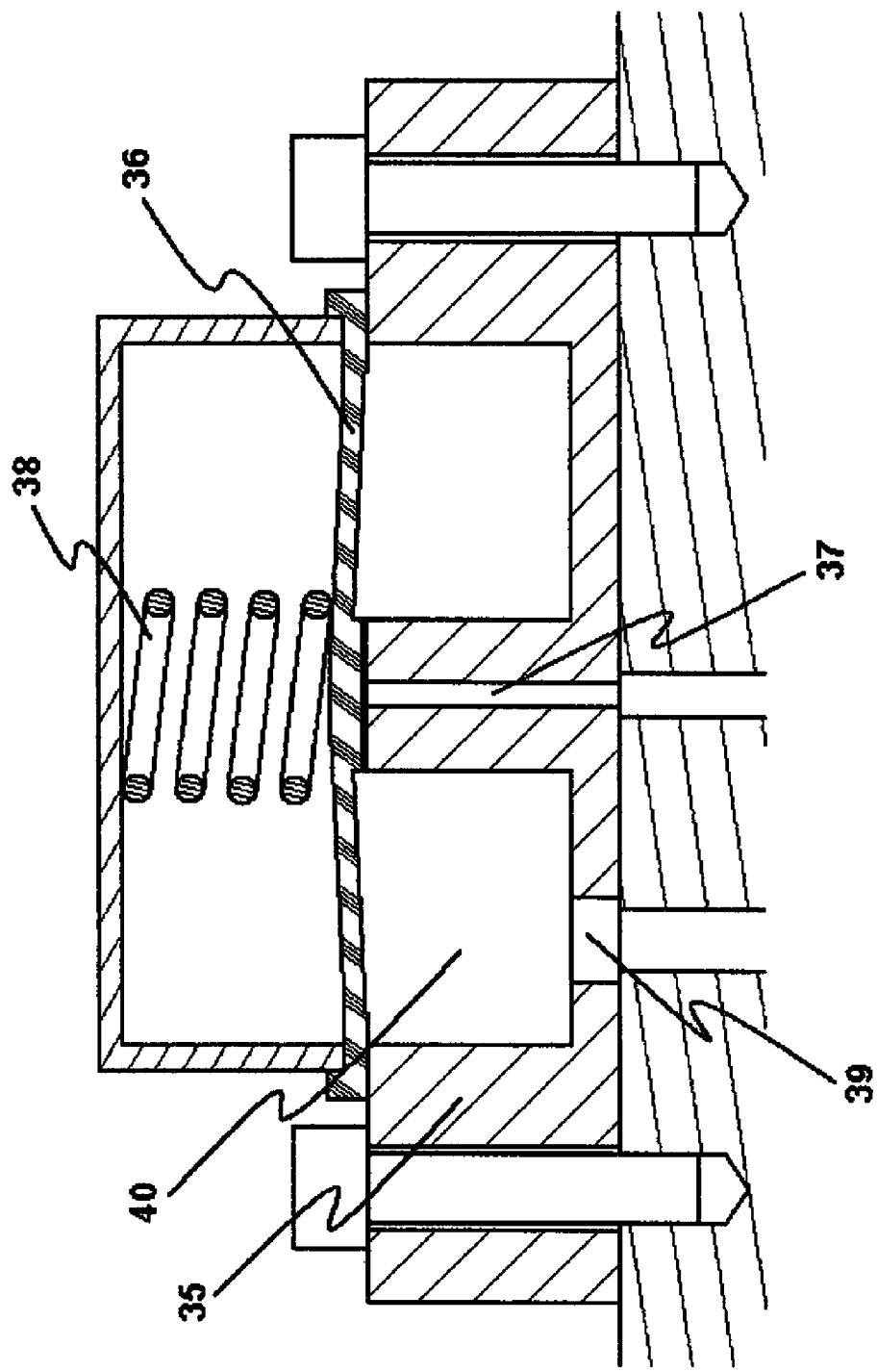
FIG. 5 provides a schematic cross-sectional view showing a generic CTI valve.

FIG. 5 shows a section view of a generic CTI valve to illustrate functionality. A valve body 35 contains a diaphragm 36 held against the tire port airway 37 with a preloaded spring 38. A hub port 39 allows air to flow into the valve chamber 40. The increased pressure pushes against the diaphragm 36 and spring 38. As the diaphragm 36 and spring 38 are displaced, the tire port airway 37 is opened and air can flow from the hub port airway 39 to the tire port airway 37.

Figure 6:
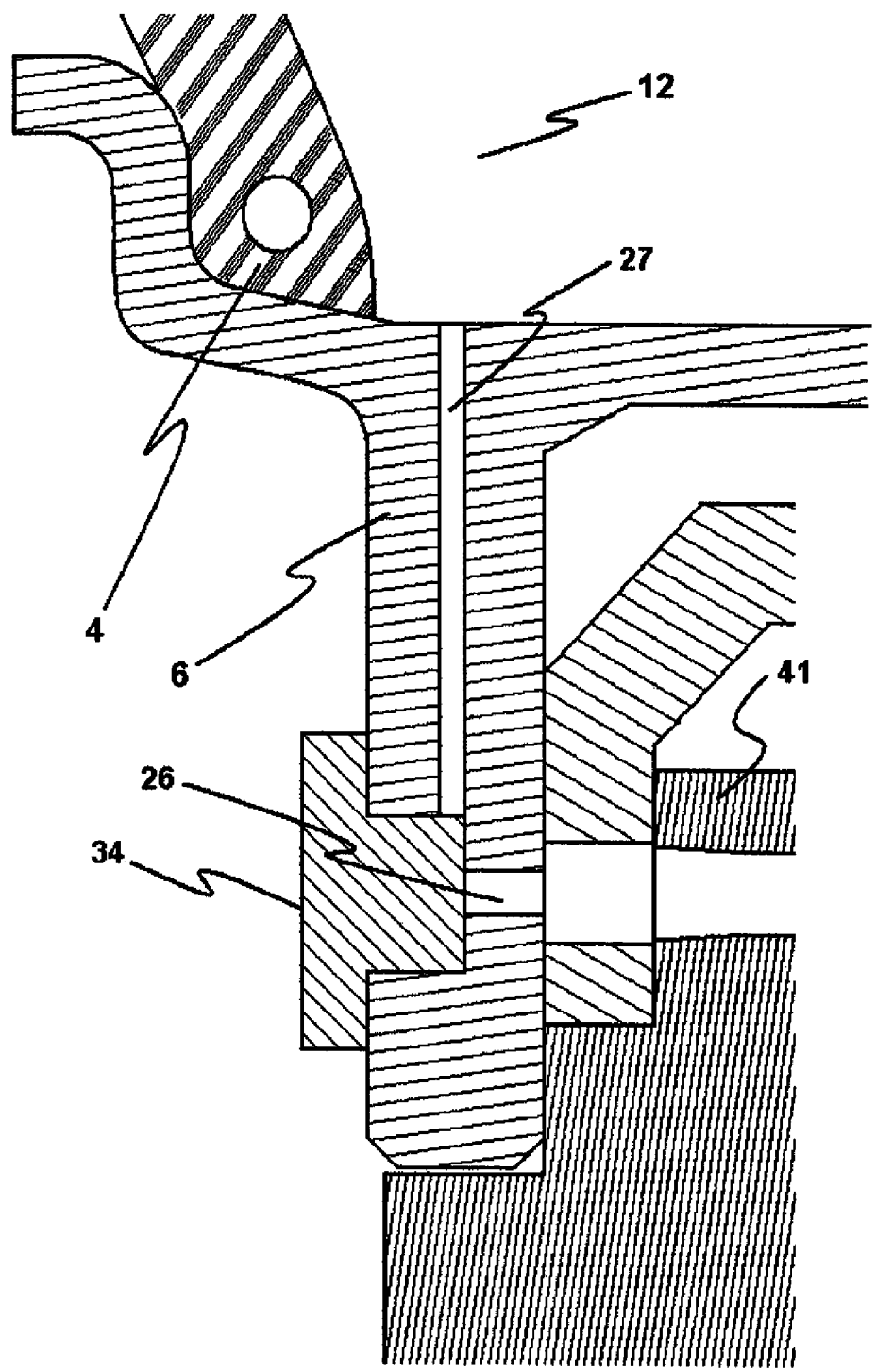
FIG. 6 provides a schematic cross-sectional view showing a first embodiment of a system having a CTI valve partially embedded into the wheel disc of a wheel.

FIG. 6 shows a CTI valve 34 partially embedded into the wheel disc 6. Details internal to the valve are not shown. Passageways in the wheel 26 and 27 bring air from the vehicle hub 41 to the valve 34 and from the valve 34 to the tire cavity 12.

Figure 7:
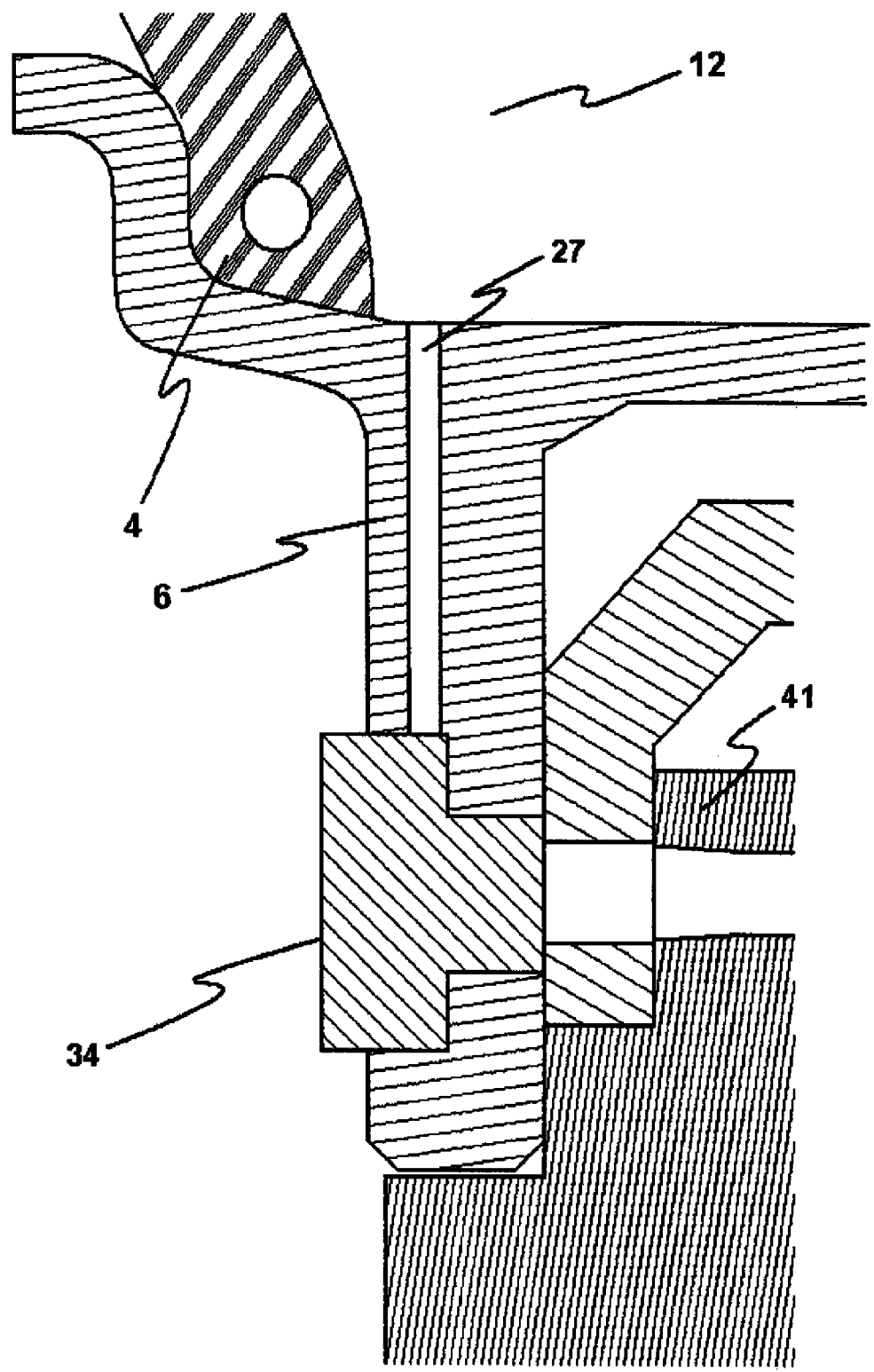
FIG. 7 provides a schematic cross-sectional view showing a second embodiment of a system having a CTI valve partially embedded in a wheel.

FIG. 7 shows a CTI valve 34 partially embedded into the wheel disc 6. The valve 34 takes air directly from a port on the vehicle hub 41, and uses an airway in the wheel 27 to bring air from the valve 34 to the tire cavity 12.

Figure 8:
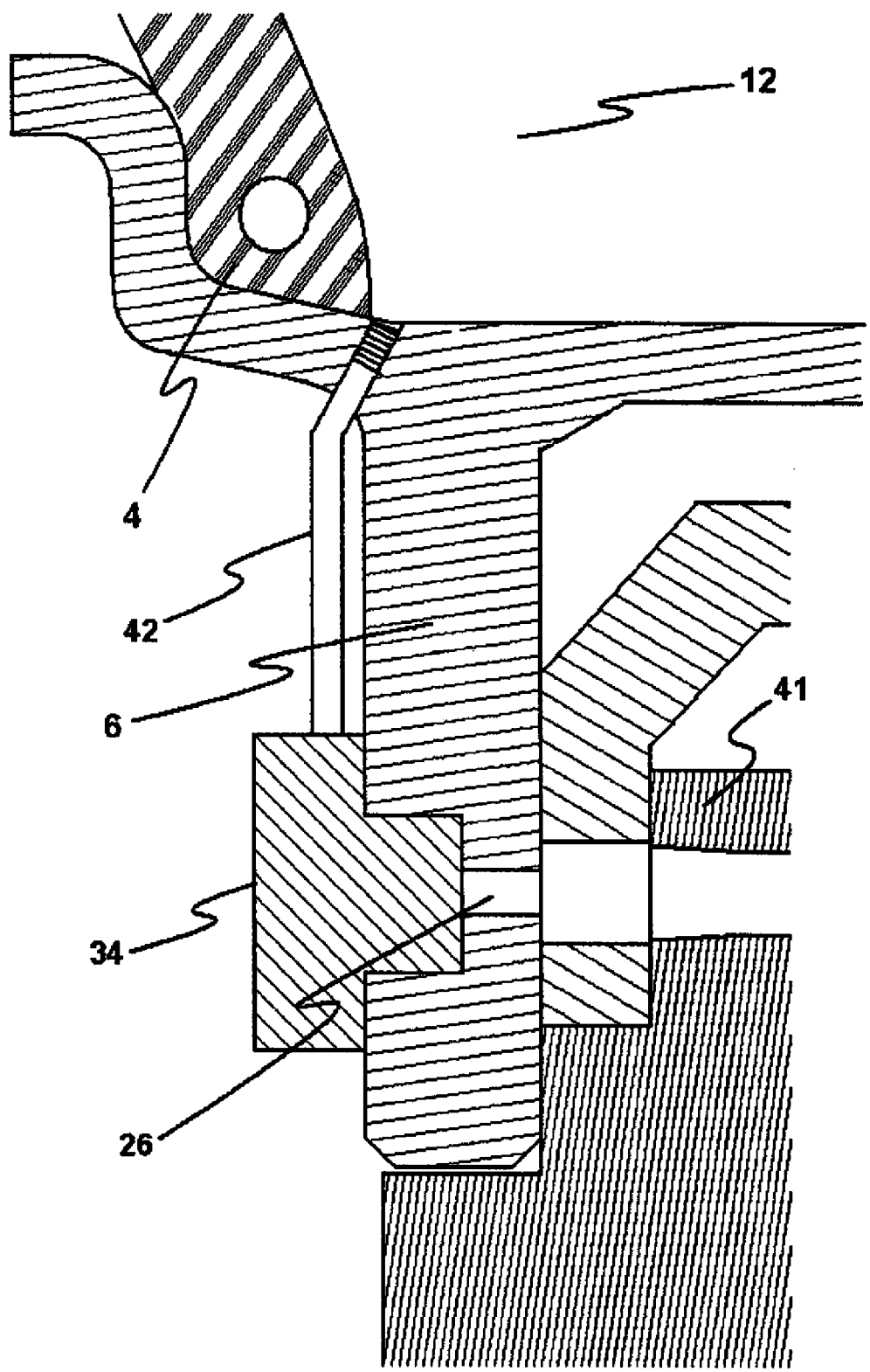
FIG. 8 provides a schematic cross-sectional view showing a third embodiment of the system having a CTI valve partially embedded in a wheel.

FIG. 8 shows a CTI valve 34 partially embedded into the wheel disc 6. A passageway in the wheel 26 brings air from the vehicle hub 41 to the valve 34, and an external means 42 (hose, tube, etc) brings air from the valve 34 to the tire cavity 12.

Figure 9:
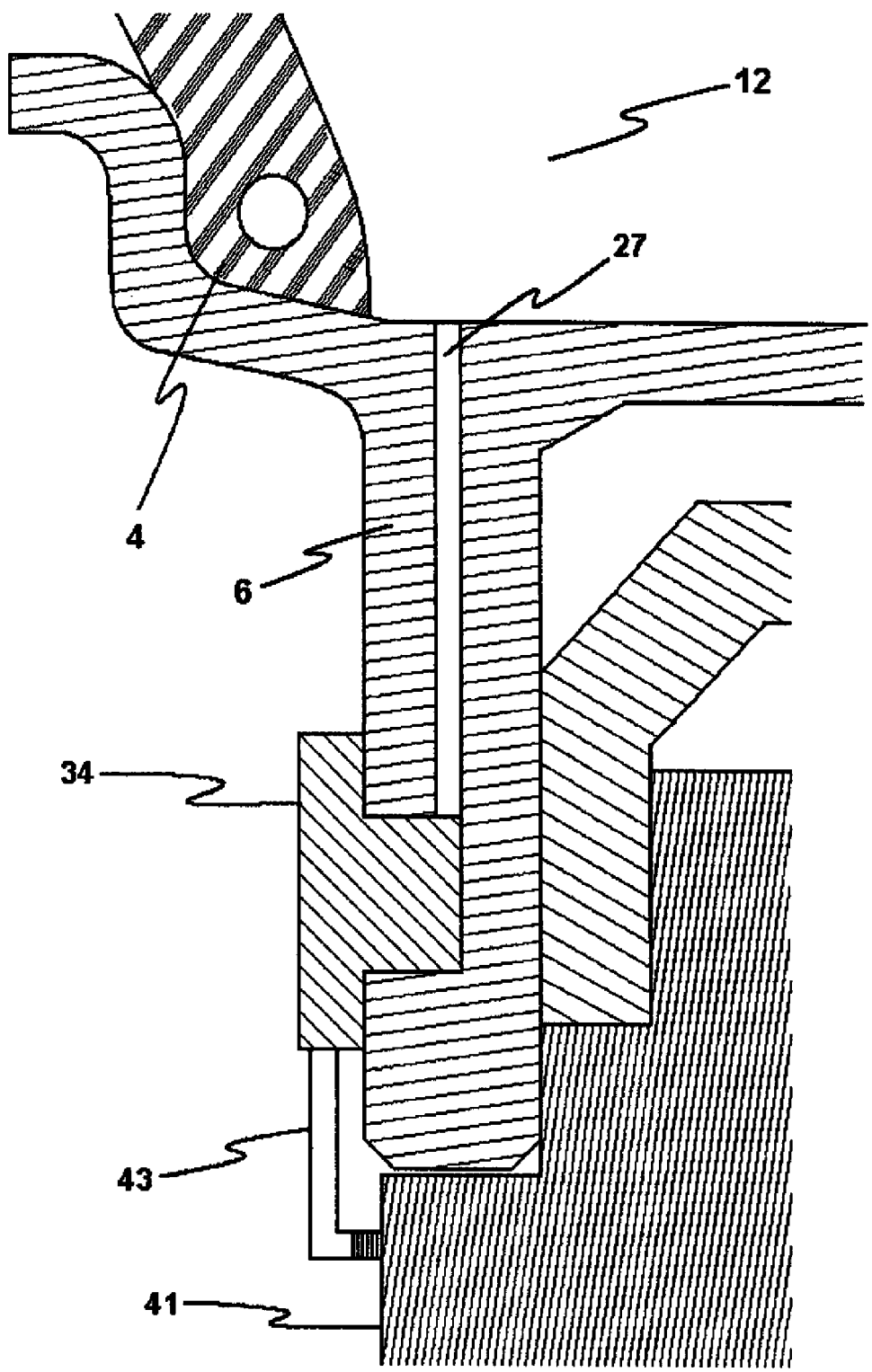
FIG. 9 provides a schematic cross-sectional view showing a fourth embodiment of the system having a CTI valve partially embedded in a wheel.

FIG. 9 shows a CTI valve 34 partially embedded into the wheel disc 6. The valve 34 takes air from the vehicle hub 41 via an external means 43 (hose, tube, etc) and brings air from the CTI valve 34 to the tire cavity 12 via an internal passageway 27 in the wheel.

Figure 10:
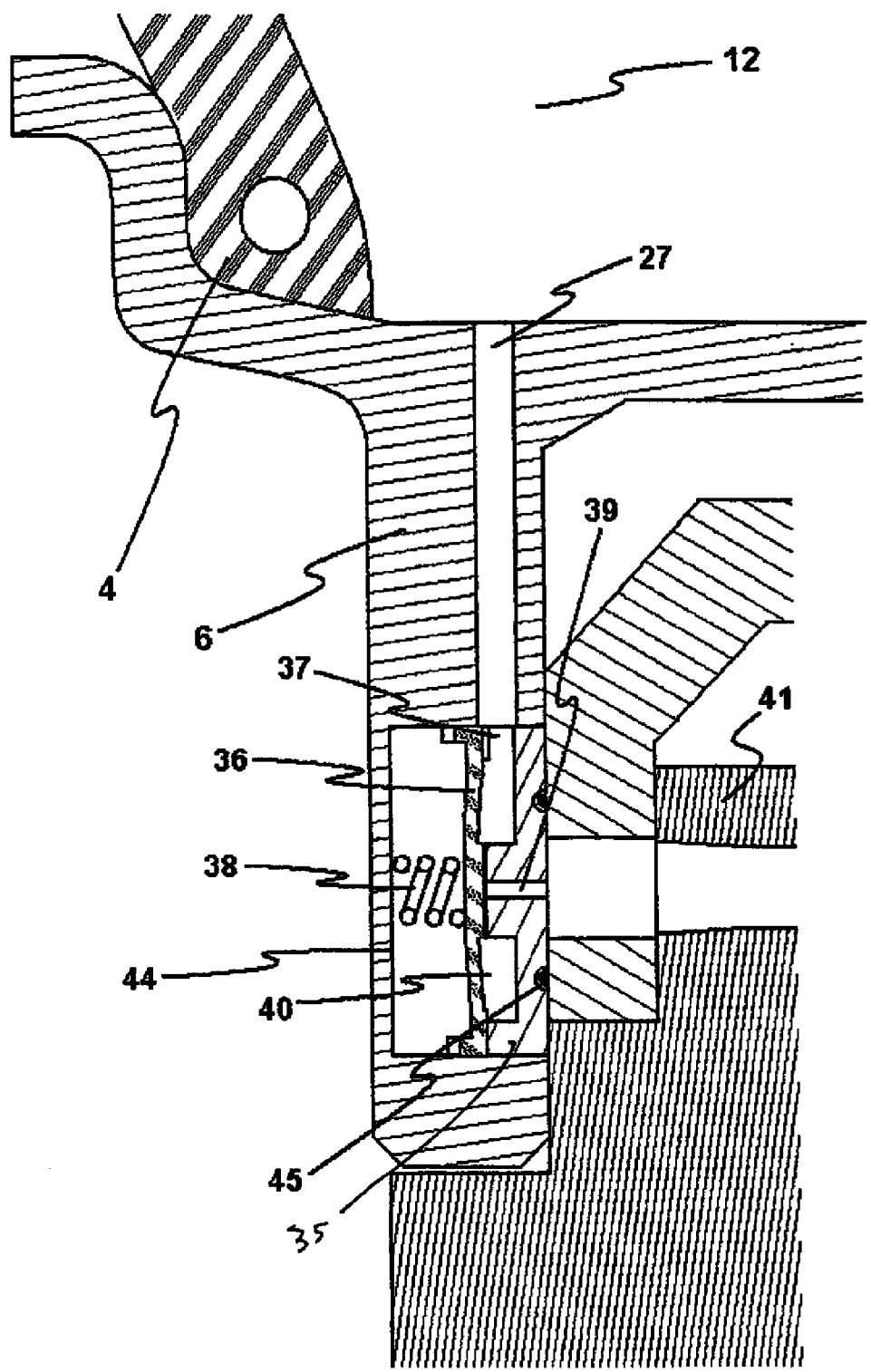
FIG. 10 provides a schematic cross-sectional view showing a fifth embodiment of a system having a CTI valve fully integrated into a wheel.

FIG. 10 shows the components of a CTI valve 44 fully integrated into the wheel disc 6. Note that FIG. 11 has the input and output channels 37 and 39 reversed compared to FIG. 5. The design of the valve itself is not an object of this disclosure, and any valve configuration or design can be used. An o-ring 45 seals the connection between the vehicle hub 41 port and the CTI entry port 39. The diaphragm 36 and spring 38 are held in a cavity in the wheel disc 6. As air flows into the valve chamber 40 from the hub 41, the diaphragm 36 and spring 38 are displaced, allowing air to move to the tire port airway 27. A passageway 27 in the wheel disc 6 allows airflow from the valve 44 to the tire cavity 12.

However, numerous variations are possible without deviating from and/or exceeding the spirit and scope of the invention.

Figure 11:
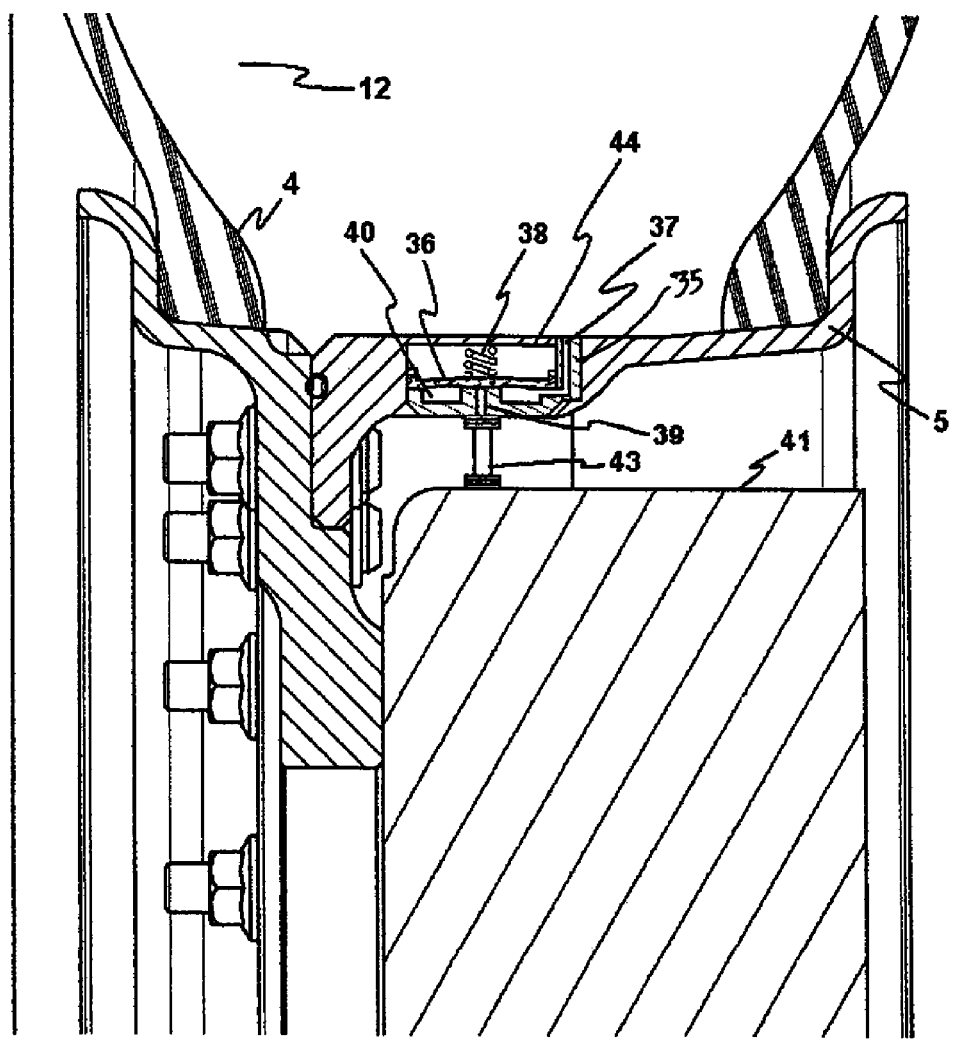
FIG. 11 provides a schematic cross-sectional view showing a sixth embodiment of a system having a fully embedded CTI valve placed in a wheel.
Figure 12:
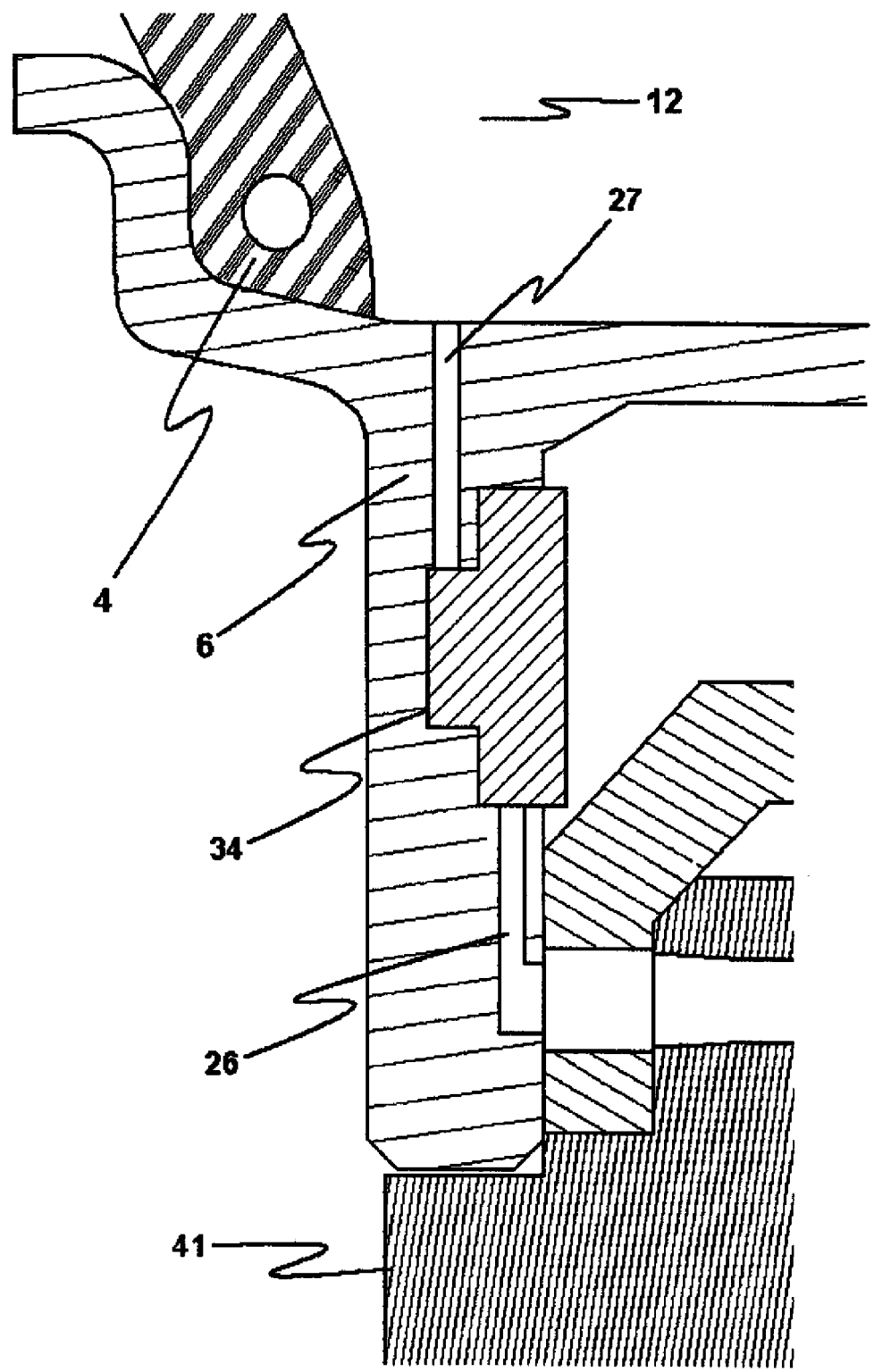
FIG. 12 provides a schematic cross-sectional view showing a seventh embodiment of a system having a partially embedded CTI valve placed in a wheel.
Figure 13:
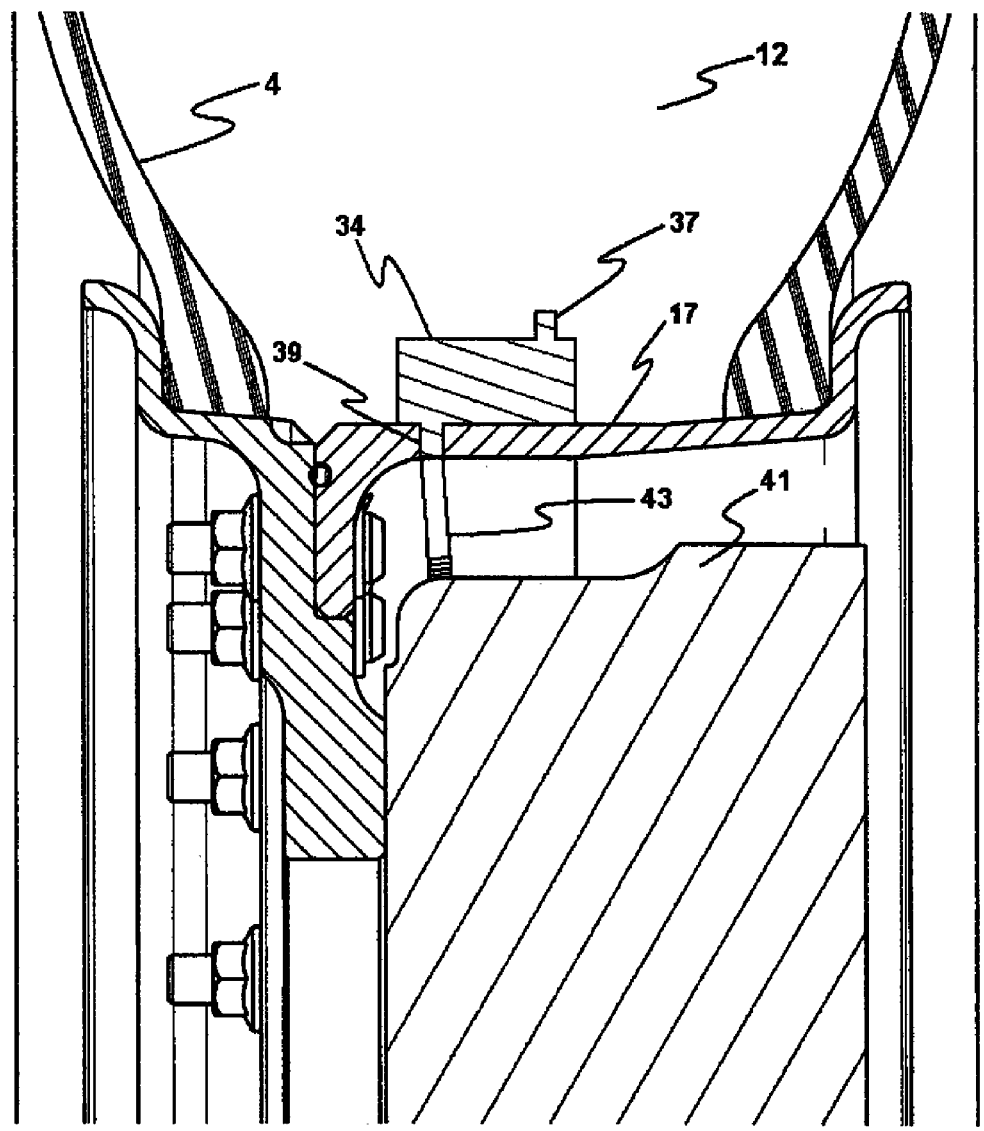
FIG. 13 provides a schematic cross-sectional view showing an eighth embodiment of a system having a partially embedded CTI valve placed in a wheel.
Figure 14:
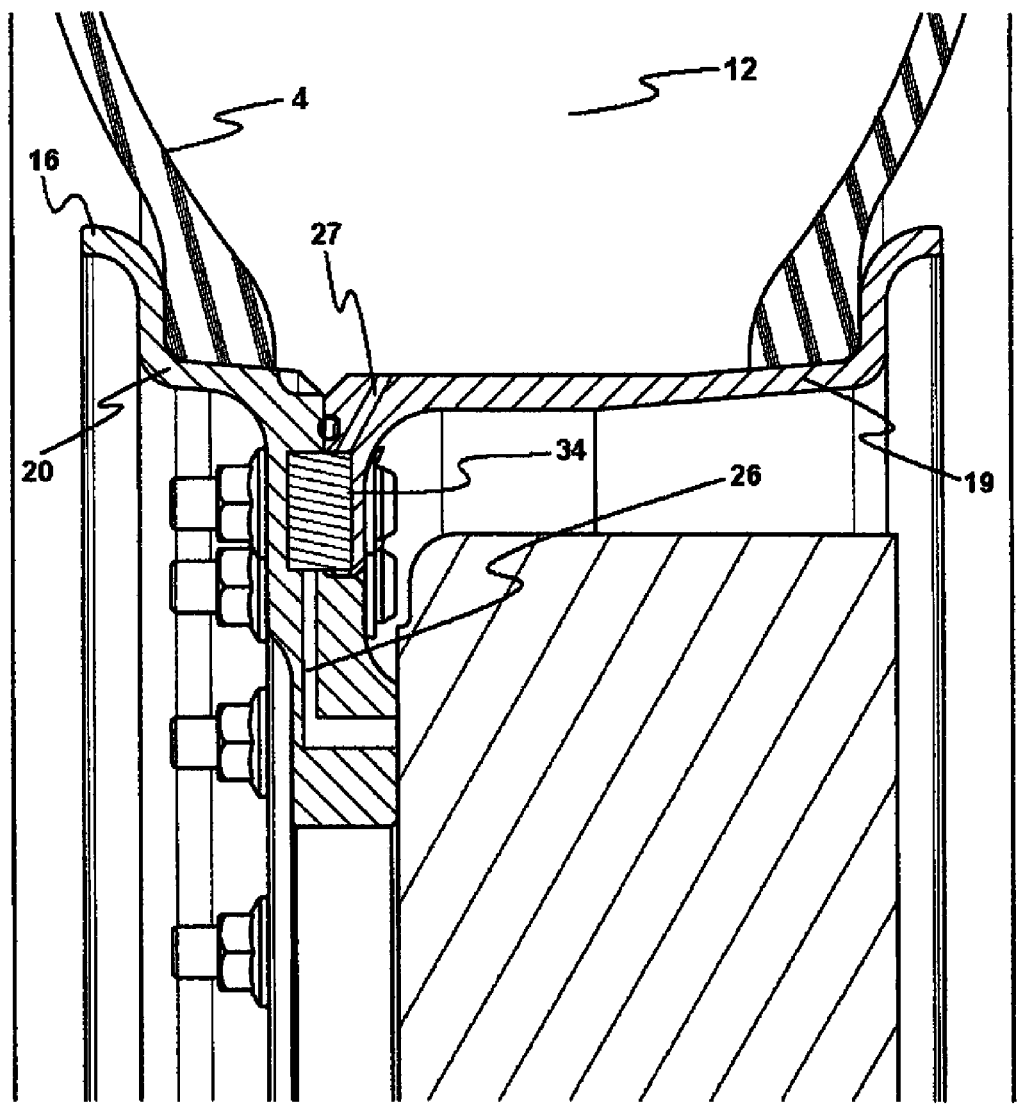
FIG. 14 provides a schematic cross-sectional view showing a ninth embodiment of a system having a partially embedded CTI valve placed in a wheel.

For example, other means of attachment can be employed to partially or fully embed a CTI valve onto or into the wheel without deviating from the spirit of the invention. This includes, but is not limited to, threaded fasteners, retaining rings, and threads on the valve and/or wheel. Also, the CTI valve can be placed in a variety of locations on or inside a wheel assembly. Thus, FIG. 11 shows a fully embedded CTI valve 44 placed in the rim portion 5 of a wheel. FIG. 12 shows a partially embedded CTI valve 34 on the inboard side of the wheel disc 6. FIG. 13 shows a partially embedded CTI valve 34 mounted on the rim portion of a wheel inside the tire cavity 12. FIG. 14 shows a partially embedded CTI valve 34 placed between the two rim halves 19 and 20 of a two-piece wheel 16. This could also be a fully embedded valve 44. Further, other locations in the wheel can be utilized to partially or fully embed the CTI valve onto or into the wheel.

In addition, although one-piece wheels 3 are shown in FIGS. 6-10, 12, 15 and 16, it is obvious that a CTI valve can be placed onto or into a two-piece wheel 16 as well. Likewise, although two-piece wheels 16 are shown in FIGS. 11, 13 and 14, it is obvious that a CTI valve can be placed onto or into a one-piece wheel 3 as well.

Further, internal passageways 26 and 27 in the wheel may or may not be used. Examples of internal passageways 26 and 27 are shown in many of the figures, but not all. FIG. 11 shows a fully embedded CTI valve 44 with components embedded in the rim portion 5 of the wheel. An air hose 43 brings air from the vehicle hub 41 to the entry port 39 of the valve 44. The valve 44 channels air into to the tire cavity 12 via the tire-side port 37 on the CTI valve 44.

FIG. 13 shows the CTI valve 34 mounted on the rim flat area 17 of the wheel. Ports in the rim flat area 17 provide a means of directing air to the CTI valve 34 from the vehicle hub 41. The CTI valve 34 mounted in the rim flat area 17 can be connected to the wheel in multiple ways, including but not limited to integration with a headlock or run flat device.

Figure 15:
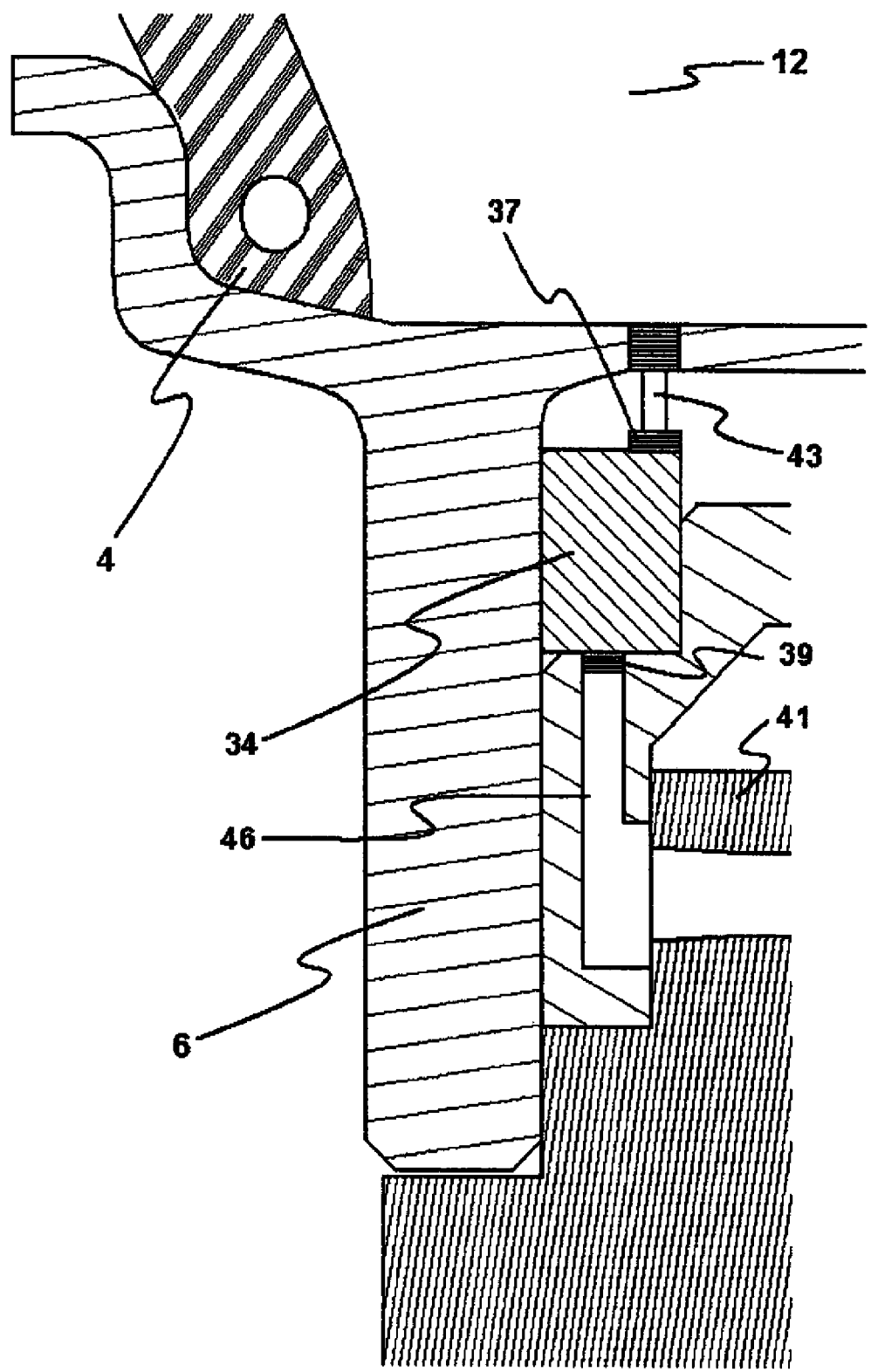
FIG. 15 provides a schematic cross-sectional view showing a tenth embodiment of a system having a partially embedded CTI valve paced in a wheel.

FIG. 15 shows a CTI valve 34 on the inboard side of the wheel disc 6. The CTI hub port airway 39 mates with an airway 46 on the vehicle hub 41. The air passes into the valve 34, and is channeled to the tire cavity 12 through an external means 43 (hose, tube, etc), not utilizing any internal passageways in the wheel.

Figure 16:
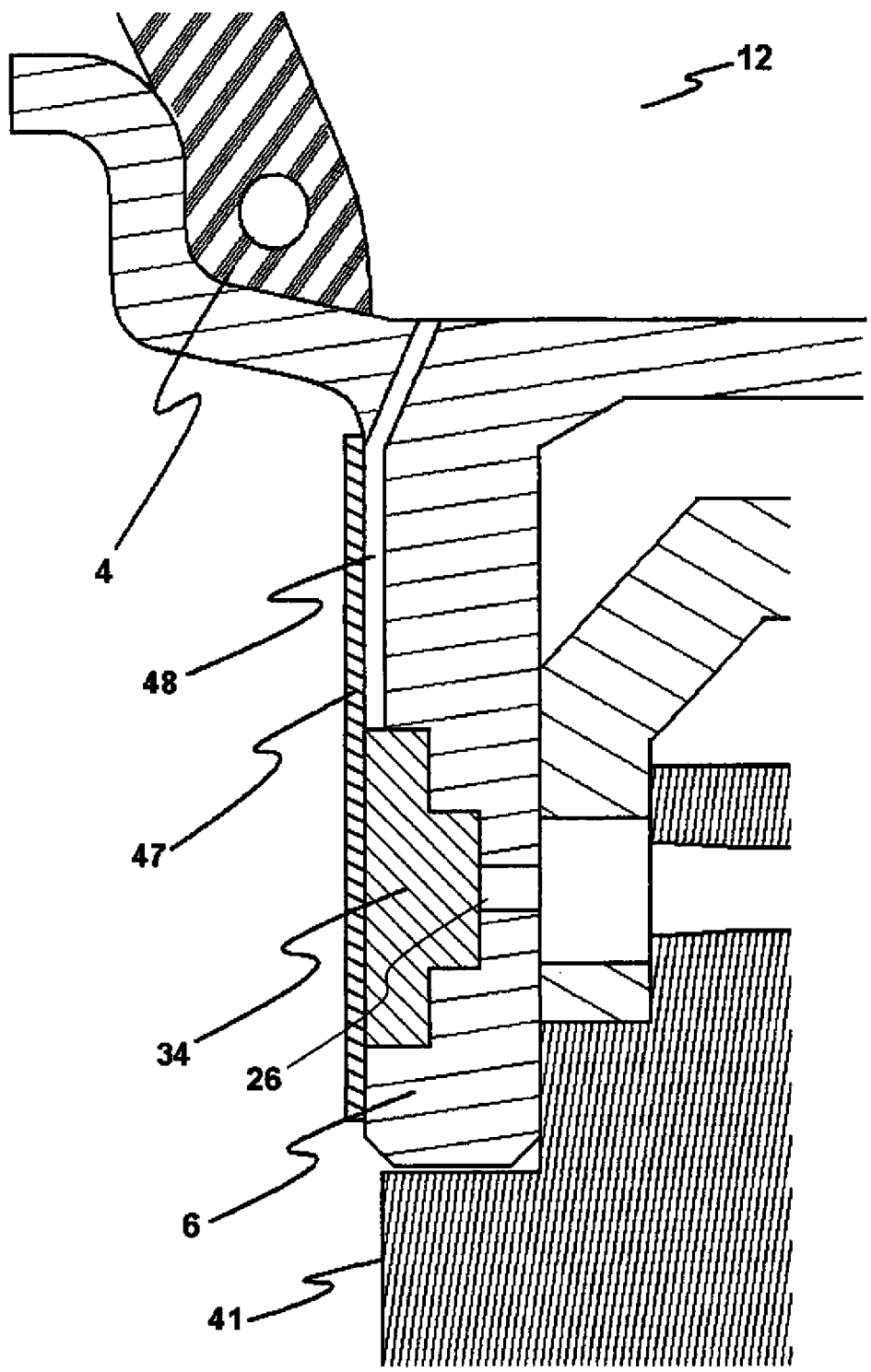
FIG. 16 provides a schematic cross-sectional view showing an eleventh embodiment of a system having a partially embedded CTI valve placed in a wheel.

FIG. 16 shows a partially embedded CTI valve 34 in the disc portion 6 of a wheel. A sealing plate 47 is used to retain the valve 34 in the wheel. Air is channeled to the CTI valve 34 from the vehicle hub 41 via air passageway 26. The sealing plate 47 seals a milled or cast-in passageway 48 in the wheel disc 6 face going from the CTI valve 34 to the tire cavity 12.

FIG. 10 shows a CTI valve sealing off air from the CTI hub side port 39 by means of an o-ring 45. Other means of sealing the valve ports 37 and 39 can be used without effecting the invention. A few examples are gaskets; thread sealers, tapered threads or any other means.

Thus, as the foregoing makes clear, our invention generally comprehends all systems where air pressure from a port on the vehicle hub travels to a CTI valve partially or fully embedded in the wheel. The valve then channels the air to the tire cavity to inflate the tire to a desired pressure. The valve can also be used to deflate the tire cavity to a desired pressure. However, as the foregoing should also make clear, numerous variations can be made without exceeding the inventive concept. Moreover, various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the claims to be filed hereafter.

What is claimed is:

1. A system, comprising:
   a wheel comprising an inboard flange portion, an outboard flange portion and a disc portion between the inboard and outboard flange portions, wherein the disc portion defines:
   a receptacle which extends axially inward from an outboard surface of a transverse face of the disc portion, into an axial thickness of the disc portion and toward an opposite transverse face of the disc portion; and
   a first air passageway formed within the wheel, wherein the first air passageway is in communication with an air passageway of a vehicle hub if the wheel is mounted to the vehicle hub; and
   a central tire inflation valve assembly positioned within the receptacle, wherein the central tire inflation valve assembly is in communication with the first air passageway.

2. The system of claim 1, wherein:
   a first end of the first air passageway is in communication with the air passageway of the vehicle hub if the wheel is mounted to the vehicle hub; and
   a second end of the first air passageway is in communication with the central tire inflation valve assembly.

3. The system of claim 2, wherein the first and second ends of the first air passageway are coaxially aligned.

4. The system of claim 1, wherein only a portion of the central tire inflation valve assembly is positioned within the receptacle.

5. The system of claim 1, wherein the central tire inflation valve assembly comprises:
   a hub-side port in communication with the first air passageway; and
   a tire-side port in communication with a second air passageway defined by the wheel.

6. The system of claim 5, wherein the second air passageway is in communication with an interior of a tire if the tire is mounted on the wheel.

7. The system of claim 5, wherein:
   a first end of the second air passageway is in communication with the tire-side port of the central tire inflation valve assembly; and
   a second end of the second air passageway is in communication with the interior of the tire if the tire is mounted on the wheel.

8. The system of claim 5, wherein the central tire inflation valve assembly further comprises a valve body.

9. The system of claim 1, wherein the wheel further defines a second air passageway formed within the wheel, and wherein the second air passageway is in communication with an interior of a tire if the tire is mounted on the wheel.

10. The system of claim 9, wherein:
    a first end of the second air passageway is in communication with the central tire inflation valve assembly; and
    a second end of the second air passageway is in communication with the interior of the tire if the tire is mounted on the wheel.

11. The system of claim 10, wherein the first and second ends of the second air passageway are coaxially aligned.

12. A system, comprising:
    a wheel comprising an inboard flange portion, an outboard flange portion and a disc portion between the inboard and outboard flange portions, wherein the disc portion defines:
    a receptacle which extends from an innermost surface of a transverse face of the disc portion, into an axial thickness of the disc portion and toward an opposite transverse face of the disc portion; and
    first and second air passageways formed within the wheel; and
    a central tire inflation valve assembly positioned within the receptacle, wherein the central tire inflation valve assembly is in communication with the first and second air passageways, and wherein only a portion of the central tire inflation valve is positioned within the receptacle.

13. The system of claim 12, wherein the central tire inflation valve assembly is positioned within the receptacle at an outboard side of the wheel.

14. The system of claim 12, wherein the central tire inflation valve assembly is positioned within the receptacle at an inboard side of the wheel.

15. The system of claim 12, wherein the first air passageway is in communication with an air passageway of a vehicle hub if the wheel is mounted to the vehicle hub.

16. The system of claim 15, wherein the second air passageway is in communication with an interior of a tire if the tire is mounted to the wheel.

17. The system of claim 12, wherein:
    the first air passageway extends from the receptacle toward a radial surface of the wheel between the inboard and outboard flange portions; and a second air passageway extends from the receptacle toward the opposite transverse face of the disc portion.

18. The system of claim 1, wherein the first air passageway extends from the receptacle toward a radial surface of the wheel between the inboard and outboard flange portions.

19. A system, comprising:
a wheel comprising an inboard flange portion, an outboard flange portion and a disc portion between the inboard and outboard flange portions, wherein the disc portion defines:
a receptacle which extends from an innermost surface of an inboard side of a transverse face of the disc portion, into an axial thickness of the disc portion and toward an opposite transverse face of the disc portion; and
a first air passageway formed within the wheel, wherein the first air passageway is in communication with an air passageway of a vehicle hub if the wheel is mounted to the vehicle hub; and
a central tire inflation valve assembly positioned within the receptacle, wherein the central tire inflation valve assembly is in communication with the first air passageway, and wherein only a portion of the central tire inflation valve assembly is positioned within the receptacle.

20. The system of claim 19, wherein the first and second ends of the first air passageway are axially offset from each other.

21. The system of claim 19, wherein:
a first end of the first air passageway is in communication with the air passageway of the vehicle hub if the wheel is mounted to the vehicle hub; and
a second end of the first air passageway is in communication with the central tire inflation valve assembly.

22. The system of claim 19, wherein the central tire inflation valve assembly comprises:

a hub-side port in communication with the first air passageway; and
a tire-side port in communication with a second air passageway defined by the wheel.

23. The system of claim 22, wherein the second air passageway is in communication with an interior of a tire if the tire is mounted on the wheel.

24. The system of claim 22, wherein:
a first end of the second air passageway is in communication with the tire-side port of the central tire inflation valve assembly; and
a second end of the second air passageway is in communication with the interior of the tire if the tire is mounted on the wheel.

25. The system of claim 22, wherein the central tire inflation valve assembly further comprises a valve body.

26. The system of claim 19, wherein the wheel further defines a second air passageway formed within the wheel, and wherein the second air passageway is in communication with an interior of a tire if the tire is mounted on the wheel.

27. The system of claim 26, wherein:
a first end of the second air passageway is in communication with the central tire inflation valve assembly; and
a second end of the second air passageway is in communication with the interior of the tire if the tire is mounted on the wheel.

28. The system of claim 27, wherein the first and second ends of the second air passageway are coaxially aligned.

29. The system of claim 19, wherein the first air passageway extends from the receptacle toward a radial surface of the wheel between the inboard and outboard flange portions.

* * * * *

UNITED STATES PATENT AND TRADEMARK OFFICE
CERTIFICATE OF CORRECTION

| | | |
|---|---|---|
| PATENT NO. | : 8,915,275 B2 | Page 1 of 1 |
| APPLICATION NO. | : 13/220065 | |
| DATED | : December 23, 2014 | |
| INVENTOR(S) | : Resare et al. | |

It is certified that error appears in the above-identified patent and that said Letters Patent is hereby corrected as shown below:

On the title page item [75] should read Pascal Serdarian

Signed and Sealed this
Twenty-ninth Day of December, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,915,275 B2 | Page 1 of 1 |
| APPLICATION NO. | : 13/220065 | |
| DATED | : December 23, 2014 | |
| INVENTOR(S) | : Resare et al. | |

It is certified that error appears in the above-identified patent and that said Letters Patent is hereby corrected as shown below:

On the title page item [75] should read Pascal Seradarian

This certificate supersedes the Certificate of Correction issued December 29, 2015.

Signed and Sealed this
First Day of March, 2016

Michelle K. Lee
*Director of the United States Patent and Trademark Office*